United States Patent [19]

Smith et al.

[11] 4,169,611
[45] Oct. 2, 1979

[54] TRAILER TONGUE EXTENSION

[76] Inventors: Dentis M. Smith, c/o George Spector, 3615 Woolworth Bldg., 233 Broadway; George Spector, 3615 Woolworth Bldg., 233 Broadway, both of New York, N.Y. 10007

[21] Appl. No.: 774,909

[22] Filed: Mar. 7, 1977

[51] Int. Cl.² ............................................. B60D 1/14
[52] U.S. Cl. ............................................. 280/482
[58] Field of Search ............... 280/414 R, 482, 43.21; 254/95, 187 HC, 187.3, 187.4; 74/528

[56] References Cited

U.S. PATENT DOCUMENTS

| | | | |
|---|---|---|---|
| 686,229 | 11/1901 | Kull | 74/495 |
| 2,320,046 | 5/1943 | Notar | 280/482 X |
| 2,799,416 | 7/1957 | Balko | 280/482 X |
| 2,894,766 | 7/1959 | Habriga | 280/482 X |
| 3,142,494 | 7/1964 | Kelley | 280/482 X |
| 3,154,325 | 10/1964 | Thompson et al. | 280/482 X |
| 3,810,661 | 5/1974 | Lowrance | 280/482 X |

Primary Examiner—John A. Pekar

[57] ABSTRACT

An extension for a trailer tongue for incorporating particularly in a boat trailer, so that if a towing vehicle cannot get close enough to the water, the tongue is then extended so the trailer and its boat can reach into the water; the trailer tongue extension consisting of an inner tongue being telescopically slidable in an outer tongue, the outer tongue being fastened to the trailer while the inner tongue has a hitch at its front end for connection to the towing vehicle, and cross pins through selective transverse openings in the inner and outer tongues locking them together at any desired extended length.

1 Claim, 4 Drawing Figures

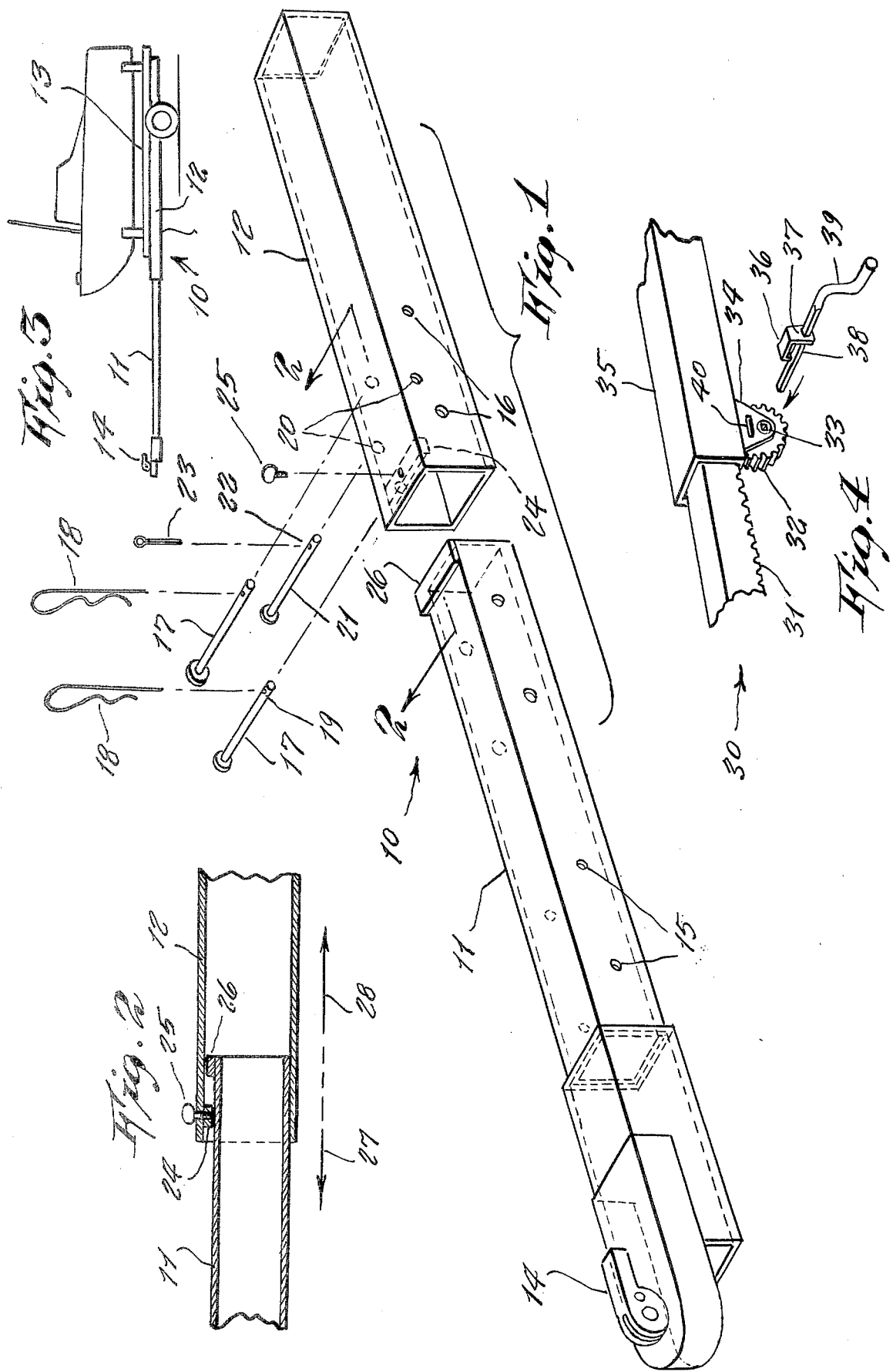

TRAILER TONGUE EXTENSION

This invention relates generally to boat trailers.

It is well known to many small boat enthusiasts who tow their boats on a trailer to a lake or other water body, that some places the towing vehicle cannot get close enough to the water for launching the boat from the trailer so that it is a laborious task for being accomplished. This situation is, of course, objectionable and is therefore, in want of an improvement.

Accordingly, it is a principal object of the present invention to provide a trailer tongue extension that allows the trailer to get to the water while the towing vehicle remains a safe distance away on dry land.

Yet another object is to provide a trailer tongue extension which is quick and effortless to extend or retract, and which can be used to either launch a boat or to pull it from the water.

Other objects are to provide a trailer tongue extension which is simple in design, inexpensive to manufacture, rugged in construction easy to use and efficient in operation.

These and other objects will be readily evident upon a study of the following specification and the accompanying drawing wherein:

FIG. 1 is an exploded perspective view of the invention structure.

FIG. 2 is a cross-section on line 2—2 of FIG. 1 and showing the spacer stopping structure.

FIG. 3 shows the invention installed on a boat trailer.

FIG. 4 shows a different model of the invention in which a crank-operated gear and rack is included for easy telescoping the tongues and which serves to limit as well as lock the telescoping distance which might be advantageous in some situations.

Referring now to the drawing in greater detail, and more particularly to FIGS. 1 and 3 thereof at this time, the reference numeral 10 represents a trailer tongue extension wherein this is an inner tongue 11 slidable in an outer tongue 12. Both tongues are made of cross sectionally square, strong metal tubings. The outer tongue is mounted on a boat trailer 13 and protrudes forwardly thereof. The inner tongue 11 extending forwardly from the outer tongue has a trailer hitch 14 mounted on its forward end for connection to a towing vehicle.

The both tongues are provided with a number of transverse openings therethrough as follows: The inner tongue has a row of holes 15 by which pins can pull the inner tongue. Holes 16 for mating with holes 15 are located along the outer tongue so to receive two pulling pins 17 in order to lock the tongues together at selected telescopic positions. A securing spring pin 18 is fitted through a hole 19 near the end of each pulling pin so to assure against falling out the tongues. A hole 20 is provided on the outer tongue for a pin 21 so to stop the inner tongue. The pin 21 has a hole 22 for receiving cotter pin 23.

A spaces 24 is mounted within a forward end of the outer tongue by means of a screw 25 against which a stop 26 on the end of the inner tongue abutts so to prevent disassembly of the tongues during telescopic intersliding, as indicated by arrows 27 and 28.

In operative use, it is now evident in case a towing vehicle cannot get close enough to a water so to launch or lift a boat between a trailer and the water, the trailer tongue extension is extended so the trailer alone is moved while the towing vehicle is kept a greater distance away.

In FIG. 4, a modified design 30 of the invention includes a toothed rack 31 along the inner tongue engaging a gear 32 supported rotatably in opening 33 of a lug 34 mounted under the outer tongue 35, the gear being rotatable by a hand crank 36. A slidable tooth 36 having square hole 37 is movable along a square shank 38 of the crank 39 so to engage a slot 40 in the lug in order to lock the gear from rotation. Thus in this design the tongues can be interlocked telescopically on any specific length as wished.

While various changes may be made in the detail construction, it is understood that such changes will be within the spirit and scope of the present invention, as is defined by the appended claims.

What is claimed is:

1. A trailer tongue extension, comprising in combination, an inner tongue, said inner tongue having a trailer hitch at its forward end for connection to a towing vehicle, and said outer tongue protrudes forwardly from a boat trailer to which it is affixed, said tongues having tubular square cross-sections fitting slidably in telescopic relationship wherein transverse holes through said tongues are provided selectively aligned and are fitted with pulling pins for securement of said tongues at a selected position, said pins being secured by transverse spring pins wherein a spacer is provided at a forward end of the inside of said outer tongue, said rear end of said inner tongue having a stop for engagement with said spacer to prevent sliding dis-engagement of said tongues, wherein said inner tongue includes a toothed rack engaging a gear supported in a bearing on a lug affixed to an underside of said outer tongue including a hand crank having a transverse square shank engaging a square opening in a hub of said gear, in further combination with a tooth having a square hole receiving slidably therethrough said square shank, said tooth being engagable with a slot in said lug in one position to lock said gear against rotation.

* * * * *